(12) United States Patent
Kim

(10) Patent No.: US 8,223,297 B2
(45) Date of Patent: Jul. 17, 2012

(54) LIQUID CRYSTAL DISPLAY DEVICE AND METHOD FOR FABRICATING THE SAME

(75) Inventor: Ki-Won Kim, Goyang (KR)

(73) Assignee: LG Display Co., Ltd., Seoul (KR)

( * ) Notice: Subject to any disclaimer, the term of this patent is extended or adjusted under 35 U.S.C. 154(b) by 352 days.

(21) Appl. No.: 12/616,023

(22) Filed: Nov. 10, 2009

(65) Prior Publication Data

US 2010/0118229 A1    May 13, 2010

(30) Foreign Application Priority Data

Nov. 12, 2008   (KR) .......................... 10-2008-0112415

(51) Int. Cl.
*G02F 1/13357* (2006.01)
*F21V 7/04* (2006.01)
*H01J 9/24* (2006.01)

(52) U.S. Cl. ............ 349/65; 349/58; 349/187; 362/615; 445/24

(58) Field of Classification Search .................... 349/58, 349/65, 187, 64, 67; 362/615, 632, 633, 362/634, 609; 445/24
See application file for complete search history.

(56) References Cited

U.S. PATENT DOCUMENTS

| | | | |
|---|---|---|---|
| 2005/0018102 A1* | 1/2005 | Hirano ............................. | 349/58 |
| 2007/0030412 A1* | 2/2007 | Park ................................ | 349/58 |
| 2008/0068530 A1* | 3/2008 | Lee et al. ........................ | 349/58 |
| 2009/0147174 A1* | 6/2009 | Ha et al. ......................... | 349/58 |

* cited by examiner

*Primary Examiner* — Dung Nguyen
*Assistant Examiner* — Tai Duong
(74) *Attorney, Agent, or Firm* — Birch, Stewart, Kolasch & Birch, LLP

(57) ABSTRACT

The present invention relates to a liquid crystal display device and a method for fabricating the same, and the liquid crystal display device may be configured by including a light guide plate with a plurality of movement prevention structures at both sides thereof, respectively; a lower cover with opening portions at the positions corresponding to the plurality of movement prevention structures, and on which the light guide plate being disposed; a light source unit disposed at a side of the light guide plate; a support main with insertion portions for inserting and mounting the movement prevention structures at the positions corresponding to the opening portions; a diffuser sheet and an optical sheet disposed on the light guide plate; and a liquid crystal panel disposed at an upper portion of the support main.

6 Claims, 2 Drawing Sheets

LIQUID CRYSTAL DISPLAY DEVICE AND METHOD FOR FABRICATING THE SAME

CROSS-REFERENCE TO RELATED APPLICATIONS

Pursuant to 35 U.S.C. §119(a), this application claims the benefit of earlier filing date and right of priority to Korean Application No. 10-2008-0112415 filed on Nov. 12, 2008, the contents of which is incorporated by reference herein in its entirety.

BACKGROUND OF THE INVENTION

1. Field of the Invention

The present invention relates to a liquid crystal display, and more particularly, to a liquid crystal display device and a method for fabricating the same in which the movement of components is prevented during the assembly procedure, thereby preventing an appearance defect from being generated by the assembly, vibration, or drop of a product.

2. Description of the Related Art

A liquid crystal display device, among many flat panel display devices that have been developed until now, has broad and various application areas such as notebooks, monitors, televisions, airplanes, and the like.

Such a liquid crystal display device is largely divided into a liquid crystal panel, a drive circuit unit, and a backlight unit.

Here, the liquid crystal panel performs a function of controlling an amount of light being transmitted therethrough to display images, and the drive circuit unit performs a function of applying various signals transmitted from a drive system to the liquid crystal panel and controlling those signals.

Furthermore, the backlight unit is used as a lighting control device for uniformly illuminating light to an overall liquid crystal panel, but the mounting of such a backlight unit functions inefficiently in the aspect of thickness, weight, and power consumption, and still many researches are going on.

Based on the location of a light emitting lamp, the backlight unit can be divided into three types, such as a direct-type backlight unit in which the light emitting lamp illuminates light from a rear surface of the liquid crystal display device directly toward a front surface thereof, a side-type backlight unit in which it is positioned at a lateral side of the light guide plate for illuminating light toward the front surface thereof through the light guide plate, and an edge-type backlight unit in which it illuminates light from the lateral surface toward the front surface thereof through an inclined light guide plate.

The side-type backlight unit diffuses light over a whole surface using a light guide plate, and thus it has a problem of low luminance because the light emitting lamp is provided at an outer wall of the light guide plate and light is passed through the light guide plate, and therefore, in recent years, light-emitting diodes (LEDs) have been primarily used as a light source.

Hereinafter, a liquid crystal display device in the related art, in which an edge-type backlight unit is mounted among the foregoing types of backlight units, will be described with reference to FIG. 1.

FIG. 1 is a cross-sectional view schematically illustrating a liquid crystal display device according to the related art.

A liquid crystal display device in the related art, as illustrated in FIG. 1, a support main 13 and a light guide plate 31 are arranged within a lower cover 11, and a diffuser sheet 35 and prism sheets 35a, 35b constituting an optical sheet 35 are laminated on the light guide plate 31, and a liquid crystal panel 41 is adhered by a light-shielding tape to be disposed in the support main 13.

Here, the liquid crystal panel 41, though not shown in the drawing, may be configured in which a lower array substrate and a color filter substrate are attached to each other to maintain a predetermined distance, and liquid crystal molecules are injected between the two substrates to form a liquid crystal layer, and polarizing plates 43a, 43b are attached to an outside of the two substrates respectively.

Furthermore, a reflection plate 37 is disposed at a lower surface of the light guide plate 31, and a plurality of light-emitting elements constituting a light source unit 33 for diffusing light to the light guide plate are disposed at a side of the light guide plate 31.

At present, the market of small-sized liquid crystal display modules using a liquid crystal display device having the foregoing configuration is trending toward slimmer designs, and the thickness of their glasses is thus reduced among the components used therein, and the rigidity becomes weaker.

As a result, according to a liquid crystal display device in the related art, a horizontal movement may be generated in a light guide plate disposed between the support mains due to the assembly, vibration, or drop of a product, thereby causing a problem such as an appearance defect of the product, component damage, or the like.

Furthermore, there have been proposed technologies for forming a movement prevention structure at the left and right sides of a light guide plate in order to improve the problem, but it may require an additional side core during the injection-molding process in order to make a separate structure for preventing the movement, thereby increasing the mold cost.

In addition, if the movement is not prevented in a horizontal or vertical direction while a light guide plate and a reflection plate being assembled to a support main, then they may not be correctly aligned during the assembly of each component, thereby increasing the manufacturing time as well as producing an appearance defect.

Moreover, if the area of a light-shielding tape is small, then the movement is generated in a horizontal direction while the light guide plate and reflection plate being assembled to a support main, and thus the light guide plate may be positioned out of place.

SUMMARY OF THE INVENTION

The present invention is to solve the aforementioned problem and an object of the invention is to provide a liquid crystal display device and a method for fabricating the same in which the movement of components is prevented during the assembly procedure, thereby preventing an appearance defect from being generated by the assembly, vibration, or drop of a product.

Furthermore, another object of the invention is to provide a liquid crystal display device and a method for fabricating the same in which opening portions are formed at the positions of a lower cover corresponding to the movement prevention structures of a light guide plate, and thus the process of injection-molding a support main can be performed in a shape such that the movement prevention structures can be inserted and provided at an inner side of the support main without requiring an additional mold cost, thereby preventing the movement of components.

In order to accomplish the foregoing object, a liquid crystal display device according to the present invention includes a light guide plate with a plurality of movement prevention structures at both sides thereof, respectively; a lower cover with opening portions at the positions corresponding to the plurality of movement prevention structures, and on which the light guide plate being disposed; a light source unit disposed at a side of the light guide plate; a support main with insertion portions for inserting and mounting the movement prevention structures at the positions corresponding to the opening portions; a diffuser sheet and an optical sheet disposed on the light guide plate; and a liquid crystal panel disposed at an upper portion of the support main.

In order to accomplish the foregoing object, a method of fabricating a liquid crystal display device according to the present invention includes the steps of forming a plurality of opening portions to be apart from one another by a predetermined distance at a lower cover; disposing a support main with insertion portions at the positions corresponding to the plurality of opening portions on the lower cover; disposing a light guide plate with a plurality of movement prevention structures at both sides corresponding to the plurality of opening portions on the lower cover to insert and mount the plurality of movement prevention structures into the insertion portions; disposing a light source unit between a side of the light guide plate and the support main; laminating a diffuser sheet and an optical sheet on the light guide plate; and disposing a liquid crystal panel at an upper portion of the support main.

Furthermore, the step of forming the support main includes the steps of preparing a lower mold with protruding portions at the positions corresponding to the plurality of opening portions; disposing the lower cover on the lower mold to allow the protruding portions to be protruded by passing through the opening portions; disposing an upper mold with a support main forming cavity at an upper portion of the lower mold including the lower cover; and filling a support main forming material into the cavity and then performing an injection-molding process to form a support main.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a liquid crystal display device and a method of fabricating the same according to the present invention will be described in detail with reference to the accompanying drawings.

Figure 1:
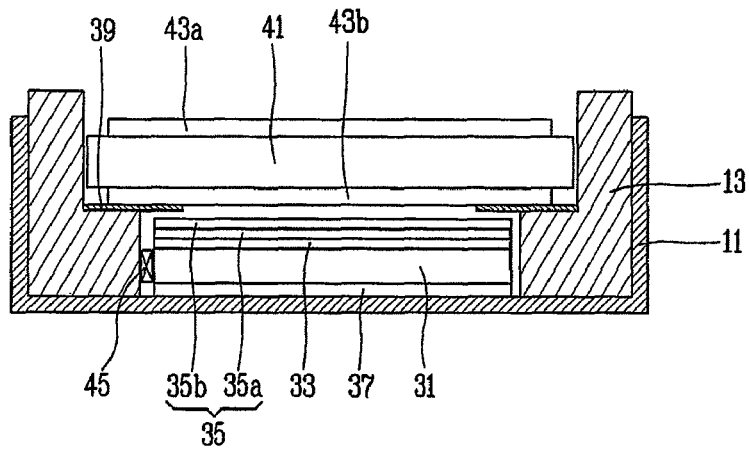
FIG. 1 is a cross-sectional view schematically illustrating a liquid crystal display device according to the related art.
Figure 2:
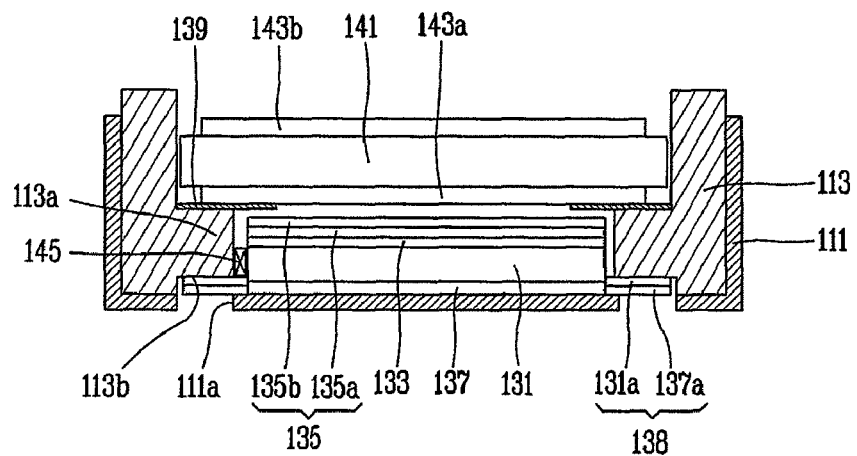
FIG. 2 is a cross-sectional view schematically illustrating a liquid crystal display device according to the present invention.

FIG. 2 is a cross-sectional view schematically illustrating a liquid crystal display device according to the present invention.

Figure 3:
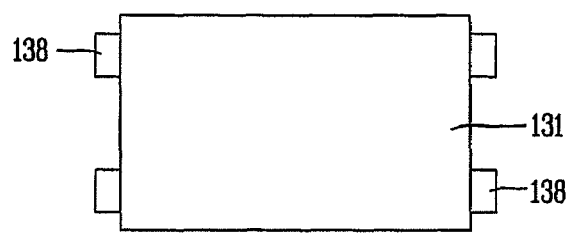
FIG. 3 is a plan view schematically illustrating a light guide plate of the liquid crystal display device according to the present invention.

FIG. 3 is a plan view schematically illustrating a light guide plate of the liquid crystal display device according to the present invention.

A liquid crystal display device according to the present invention, as illustrated in FIG. 2, may be configured by including a light guide plate 131 formed with a plurality of first movement prevention structures 131a at both sides thereof respectively; a lower cover 111 formed with formed with opening portions 111a at the positions corresponding to the plurality of first movement prevention structures 131a; a light source unit 145 disposed at a side of the light guide plate 131; a support main 113 formed with insertion portions 113b, which are provided with a space for inserting and mounting the first movement prevention structures 131a at the positions corresponding to the opening portions 111a, in order to protect and support the light source unit 145, the light guide plate 131, and liquid crystal panel 141; and an optical sheet 135 and the liquid crystal panel 141 laminated at an upper portion of the support main 113.

Here, as illustrated in FIGS. 2 and 3, a plurality of first movement prevention structures 131a are formed at both sides of the light guide plate 131 to be apart from one another by a predetermined distance, and at least two of the first movement prevention structures 131a are preferably formed at both sides of the light guide plate 131. At this time, the light guide plate 131 converts light entered from light-emitting elements into a surface light source and guides it to a side of the liquid crystal panel 141. Furthermore, a reflection sheet 137 made of a prism structure or a reflective material is disposed at a lower surface of the light guide plate 131, and second movement prevention structures 137a having the same size and position as the first movement prevention structures 131a formed at both sides of the light guide plate 131 are formed at both sides of the reflection sheet 137. Here, the first movement prevention structures 131a and the second movement prevention structures 137a are commonly designated as a movement prevention structure 138.

Furthermore, a landing portion 113a is protruded in a horizontal direction at the support main 113 to allow the liquid crystal panel 141 to be landed and supported, and an insertion portion 113b formed with a space for inserting the movement prevention structure 138 of the light guide plate 131 in an inward direction is provided at a lower portion of the landing portion 113a. At this time, the movement prevention structure 138 of the light guide plate 131 is inserted into the insertion portion 113b provided at the support main 113 to be supported, thereby preventing the light guide plate 131 from being horizontally or vertically moved.

In addition, a diffuser sheet 133 is disposed between the light guide plate 131 and the optical sheet 135. At this time, the optical sheet 135 is configured with a plurality of prism sheets 135a, 135b for refocusing light luminance that has passed through the diffuser sheet 133 to increase the light luminance. Here, the diffuser sheet 133 diffuses light entered into the light guide plate 131, thereby preventing the phenomenon of densely-populated light.

The light source unit 145 is configured with a plurality of light-emitting diodes that spontaneously emit light. Here, a plurality of light-emitting elements are used as a light source unit 145, but a cold cathode fluorescent lamp (CCFL) or other light sources may be used if the need arises.

On the other hand, the liquid crystal panel 141, though not shown in the drawing, may be configured in which a thin-film transistor array substrate (not shown) and a color filter substrate (not shown) are attached to each other to maintain a predetermined distance, and liquid crystal molecules are interposed between the two substrates to form a liquid crystal layer (not shown), and polarizing plates 143*a*, 143*b* are attached to an outside of the two substrates respectively.

Here, the thin-film transistor array substrate (not shown), though not shown in the drawing, includes a plurality of gate lines (not shown) and a plurality of data lines (not shown) arranged to be intersected with each other, a gate drive circuit unit and a data drive circuit unit connected to the plurality of gate lines (not shown) and the plurality of data lines (not shown) respectively, thin-film transistors (not shown) each formed at a region where the plurality of gate lines (not shown) and data lines (not shown) are intersected with each other and provided for each unit pixel, and a pixel area defined in an area where the plurality of gate lines and the plurality of data lines are intersected with each other.

Furthermore, though not shown in the drawing, the color filter substrate is formed with red, green, and blue color filter layers at the positions corresponding to the pixels, and also a black matrix is formed between the color filter layers to prevent light from being leaked between the color filter layers, and suppress the color interference of light passing through the pixel.

A common electrode and a pixel electrode are formed at the inner surfaces facing the color filter substrate and the thin-film transistor array substrate respectively in order to apply an electric field to the liquid crystal layer. At this time, the pixel electrode is formed for each pixel on the thin-film transistor array substrate whereas the common electrode is formed on a front surface of the color filter substrate in an integrated form. As a result, the alignment state of liquid crystal molecules in the liquid crystal layer is changed by controlling a voltage applied to the pixel electrode while a voltage being applied to the common electrode, thereby individually controlling the optical transmittance of the pixels.

Though it is described a case in which the common electrode is formed on a front surface of the color filter substrate, as described above, the common electrode may be formed on a thin-film transistor array substrate according to the drive mode of a liquid crystal display device.

As a result, in case of a liquid crystal display device having the foregoing configuration according to the present invention, movement prevention structures formed at both sides of the light guide plate are inserted into the insertion portions of a support main to be fixed and supported and thus a vertical and horizontal movement of components can be suppressed, thereby preventing an appearance defect from being caused by the assembly, vibration, or drop of a product.

On the other hand, a method of fabricating a liquid crystal display device according to the present invention will be described below in detail with reference to FIGS. 4A through 4C.

Figure 4A:
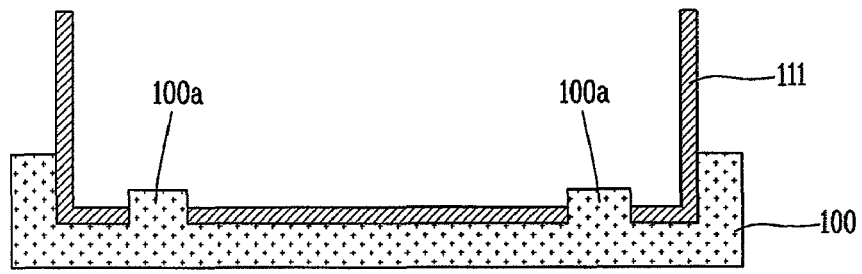
FIGS. 4A through 4C are procedural cross-sectional views schematically illustrating a method of fabricating a liquid crystal display device according to the present invention.
Figure 4B:
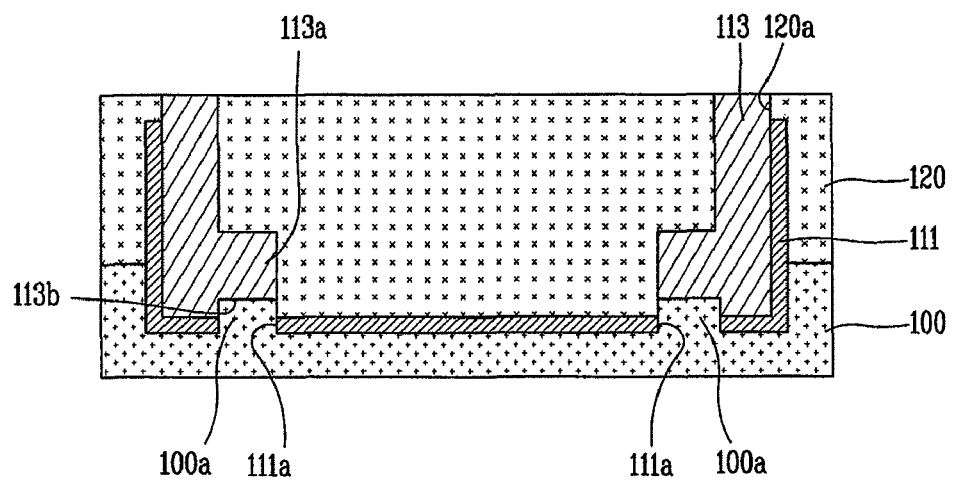
Figure 4C:
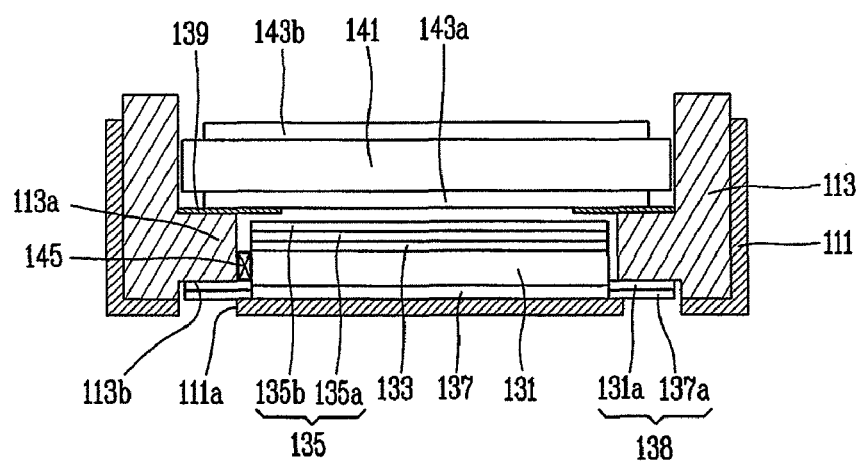

FIGS. 4A through 4C are procedural cross-sectional views schematically illustrating a method of fabricating a liquid crystal display device according to the present invention.

As illustrated in FIG. 4A, a plurality of opening portions 111*a* are formed to be apart from one another by a predetermined distance at a lower cover 111.

Next, a lower mold 100 is prepared in which protruding portions 100*a* are formed at the positions corresponding to the plurality of opening portions 111*a*.

Subsequently, the lower cover 111 is disposed on the lower mold 100 in such a manner that the protruding portions 100*a* are protruded by passing through the opening portions 111*a*.

Next, as illustrated in FIG. 4B, a support main 113 is formed by disposing an upper mold 120 prepared with a support main forming cavity 120*a* at an upper portion of the lower mold 100 including the lower cover 111, and then filling a support main forming material into the cavity 120*a* and then performing an injection-molding process. At this time, a landing portion 113*a* for supporting the liquid crystal panel 141 is formed in a protruding manner, and an insertion portion 113*b* is provided at a lower portion of the landing portion 113*a* to allow the movement prevention structure 138 of the light guide plate to be inserted and supported.

Subsequently, as illustrated in FIG. 4C, the support main 113 is injection-molded and then the lower mold 100 and the upper mold 120 are released, and then a light guide plate 131 is disposed in such a manner that the movement prevention structures 138 are inserted and provided into the insertion portions 113*b* of the support main 113 on the lower cover 111 between the support mains 113. At this time, a reflection sheet 137, at both sides of which the movement prevention structures 137*a* constituting the movement prevention structure 138 are formed, is attached to a lower surface of the light guide plate 131. At this time, the light guide plate 131 converts light entered from light-emitting elements into a surface light source and guides it to a side of the liquid crystal panel 141. At this time, the movement prevention structures 138 of the light guide plate 131 are inserted into the insertion portions 113*b* provided at the support main 113 to be supported, thereby preventing the light guide plate 131 from being horizontally or vertically moved.

Next, a light source unit 145 configured with a plurality of light-emitting diodes is disposed between a side of the light guide plate 131 and the support main 113. At this time, the light source unit 145 is configured with a plurality of light-emitting diodes that spontaneously emit light. Here, a plurality of light-emitting elements are used as a light source unit 145, but a cold cathode fluorescent lamp (CCFL) or other light sources may be used if the need arises.

Subsequently, a light guide plate 131 and an optical sheet 135 are laminated at an upper portion of the light guide plate 131. At this time, the optical sheet 135 is configured with a plurality of prism sheets 135*a*, 135*b* for refocusing light luminance that has passed through the diffuser sheet 133 to increase the light luminance. Here, the diffuser sheet 133 diffuses light entered into the light guide plate 131, thereby preventing the phenomenon of densely-populated light.

Next, a liquid crystal panel 141 is disposed in such a manner that it is positioned at an upper portion of the optical sheet 135 and adhered to a landing portion 113*a* of the support main 113 by a light-shielding tape 139 to be supported. Here, the liquid crystal panel 141, though not shown in the drawing, may be configured in which a thin-film transistor array substrate (not shown) and a color filter substrate (not shown) are attached to each other to maintain a predetermined distance, and liquid crystal molecules are interposed between the two substrates to form a liquid crystal layer (not shown), and polarizing plates 143*a*, 143*b* are attached to an outside of the two substrates respectively.

Here, in the thin-film transistor array substrate (not shown), though not shown in the drawing, a plurality of gate lines (not shown) and a plurality of data lines (not shown) are arranged to be intersected with each other, and a gate drive circuit unit and a data drive circuit unit are formed to connect the plurality of gate lines (not shown) with the plurality of data lines (not shown) respectively, thin-film transistors (not shown) provided for each unit pixel are formed at a region where the plurality of gate lines (not shown) and data lines (not shown) are intersected with each other, and a pixel area is defined in an area where the plurality of gate lines and the plurality of data lines are intersected with each other.

Furthermore, though not shown in the drawing, the color filter substrate is formed with red, green, and blue color filter layers at the positions corresponding to the pixels, and also a black matrix is formed between the color filter layers in order to prevent light from being leaked between the color filter layers, and suppress the color interference of light passing through the pixel.

A common electrode and a pixel electrode are formed at an inner surfaces facing the color filter substrate and the thin-film transistor array substrate respectively, in order to apply an electric field to the liquid crystal layer. At this time, the pixel electrode is formed for each pixel on the thin-film transistor array substrate whereas the common electrode is formed in an integrated form on a front surface of the color filter substrate.

As a result, the alignment state of liquid crystal molecules in the liquid crystal layer is changed by controlling a voltage applied to the pixel electrode while a voltage being applied to the common electrode, thereby individually controlling the optical transmittance of the pixels. Though, as described above, it is described a case in which the common electrode is formed on a front surface of the color filter substrate, the common electrode may be formed on a thin-film transistor array substrate according to the drive mode of a liquid crystal display device.

As a result, in case of a liquid crystal display device fabricated as described above according to the present invention, movement prevention structures formed at both sides of the light guide plate are inserted into the insertion portions of the support main to be fixed and supported, and thus a vertical and horizontal movement of the components can be suppressed, thereby preventing an appearance defect from being caused by the assembly, vibration, or drop of a product.

In addition, according to the present invention, opening portions are formed at the positions of a lower cover corresponding to the movement prevention structures of a light guide plate during the process of injection-molding a support main, and thus the support main formed with insertion portions, in which the movement prevention structures are inserted and provided, may be formed by an upper mold in such a manner that the protruding portions of a lower mold are protruded by passing through those opening portions, thereby not requiring an additional mold cost.

Although the present invention has been described with reference to the preferred embodiments as illustrated in the drawings, these are merely illustrative, and it should be understood by those skilled in the art that various modifications and equivalent other embodiments of the present invention can be made.

What is claimed is:

1. A liquid crystal display device, comprising:
   a light guide plate with a plurality of movement prevention structures at both sides thereof, respectively;
   a reflection sheet attached to a lower surface of the light guide plate, wherein the reflection sheet has movement prevention structures similar to the plurality of movement prevention structures formed at both sides thereof;
   a lower cover with opening portions at the positions corresponding to the plurality of movement prevention structures, and on which the light guide plate being disposed;
   a light source unit disposed at a side of the light guide plate;
   a support main with insertion portions for inserting and mounting the movement prevention structures at the positions corresponding to the opening portions;
   a diffuser sheet and an optical sheet disposed on the light guide plate; and
   a liquid crystal panel disposed at an upper portion of the support main.

2. The liquid crystal display device of claim 1, wherein at least two of the plurality of movement prevention structures are formed at both sides of the light guide plate, respectively.

3. A method of fabricating a liquid crystal display device, comprising:
   forming a plurality of opening portions to be apart from one another by a predetermined distance at a lower cover;
   disposing a support main with insertion portions at the positions corresponding to the plurality of opening portions on the lower cover;
   disposing a light guide plate with a plurality of movement prevention structures at both sides corresponding to the plurality of opening portions on the lower cover to insert and mount the plurality of movement prevention structures into the insertion portions;
   disposing a light source unit between a side of the light guide plate and the support main;
   laminating a diffuser sheet and an optical sheet on the light guide plate; and
   disposing a liquid crystal panel at an upper portion of the support main.

4. The method of fabricating a liquid crystal display device of claim 3, wherein at least two of the plurality of movement prevention structures are formed at both sides of the light guide plate, respectively.

5. The method of fabricating a liquid crystal display device of claim 3, further comprising:
   attaching a reflection sheet with movement prevention structures similar to the movement prevention structures at both sides thereof to a lower surface of the light guide plate.

6. The method of fabricating a liquid crystal display device of claim 3, wherein the step of forming the support main further comprises:
   preparing a lower mold with protruding portions at the positions corresponding to the plurality of opening portions;
   disposing the lower cover on the lower mold to allow the protruding portions to be protruded by passing through the opening portions;
   disposing an upper mold with a support main forming cavity at an upper portion of the lower mold including the lower cover; and
   filling a support main forming material into the cavity and then performing an injection-molding process to form a support main.

* * * * *